April 6, 1937.   R. Z. WILLIAMS   2,076,392
DEHAZING FURNACE OIL
Filed Jan. 8, 1936
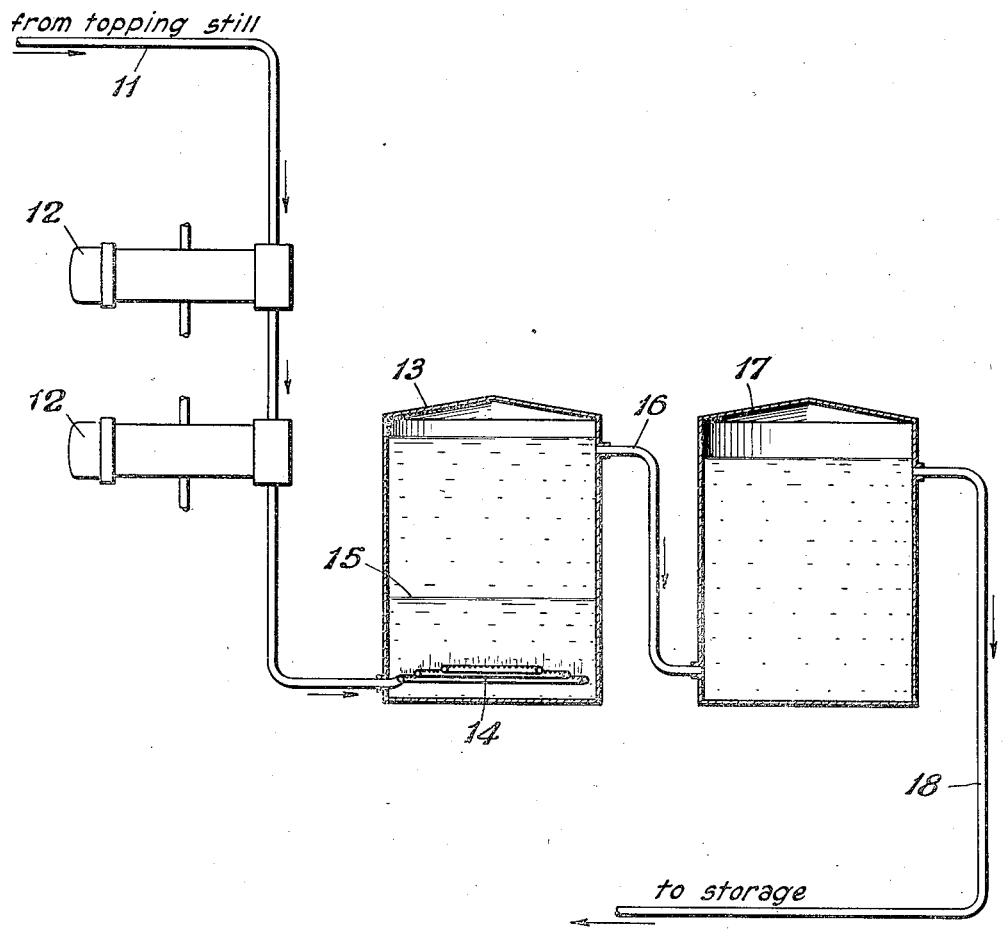
INVENTOR
Richard Z. Williams
BY
ATTORNEY Patented Apr. 6, 1937

2,076,392

UNITED STATES PATENT OFFICE 2,076,392

DEHAZING FURNACE OIL

Richard Z. Williams, Destrehan, La., assignor to Pan American Petroleum Corporation, New York, N. Y., a corporation of Delaware Application January 8, 1936, Serial No. 58,169

12 Claims. (Cl. 196—41)

This invention relates to the treating and dehazing of petroleum distillates, and more particularly to the treating and dehazing of petroleum distillates of the type known as furnace oils.

It is an object of my invention to provide a simple and efficient method for treating petroleum distillates and particularly for removing haze from petroleum distillates such as furnace oils. Other and more detailed objects of my invention will become apparent as the description thereof proceeds.

I have found that distillates of the furnace oil type are frequently hazy due to the suspension therein of some oil-insoluble material which is not readily removed by ordinary treating operations and I have discovered that this haze-forming material can be removed readily by treating with alkali, provided the treating operation is conducted at a temperature within a critical range.

Thus for example, I have found that a certain No. 2 domestic fuel oil distillate (commonly referred to as furnace oil) from a topping plant contains haze-forming material which is not removed by conventional treating operations. I have found that this haze can, however, be removed by a simple operation which I will now describe with particular reference to the accompanying drawing, which is a conventionalized flow diagram of one embodiment of my invention and which forms a part of this specification.

The distillate referred to was passed from a topping still through line 11 and heat exchangers 12 to an ordinary run-down tank 13. The incoming oil entered tank 13 through a spray distributor 14 in the bottom of the tank. In tank 13 I placed a four foot depth of 10° Baumé caustic soda, the top of which is shown by interface 15. After rising through the caustic, the treated oil was permitted to overflow through line 16 into the bottom of a second run-down tank 17 which served as a settler. From the top of tank 17 treated oil passed to storage through line 18.

In order to control the temperature of the treating step, I found that it was desirable to start the operation with the oil at a temperature of about 320° F.–330° F. until the temperature of the caustic rose to about 180° F., at which time I found it desirable to drop the temperature of the oil by means of cooler 12 to about 180° F.–190° F. The temperature of the second settling tank 17 can suitably be about 150° F. but this is not critical.

As a result of both laboratory and plant experiments, I have found that if the temperature of the treating operation is 160° F. or less the oil will neither treat nor clear up. However, if the temperature is raised to 180° F., the operation functions perfectly. It appears that the minimum temperature for effective operation is about 170° F. The maximum temperature is also critical and I find it best to operate at a maximum temperature of 210° F. or less. The preferred range is 180° F.–200° F.

The concentration of the caustic, which is, of course, used in aqueous solution, can be varied within a considerable range. Thus for example, I have found that the caustic can be reduced in strength as a result of the operation to as low as 4° Baumé and still function entirely satisfactorily. The concentration can suitably be from 1% to 15% NaOH but preferably 2% to 10% NaOH.

While I prefer to use caustic soda (sodium hydroxide), equivalent materials, such as the hydroxides of potassium and the other alkali metals and the corresponding carbonates, can be used. All of these equivalent materials together with caustic soda itself are referred to in the claims as "alkali".

It will of course be readily understood that the apparatus shown in the drawing is merely one convenient form of apparatus and that various modifications can be used. Thus for example, it is quite feasible to use two small tanks five or six feet in diameter and ten feet high filled with an aqueous solution of caustic. The oil can be passed into the bottom of one of these tanks and out at the top, the other tank being retained as a standby for use while the first tank is being cleaned.

In fact any conventional type of treating equipment can be used, the important feature of my invention being treatment with an aqueous solution of alkali at a temperature within the range before referred to.

My invention is particularly applicable to distillates of the type known as furnace oils which are somewhat heavier and higher boiling than ordinary kerosenes and lighter and lower boiling than the ordinary heavy fuel oils and lubricating oils. The distillates to which my invention is particularly applicable usually have Saybolt universal viscosities within the range 33–70 seconds at 100° F., 10% A. S. T. M. distillation points within the range 400° F.–425° F., and A. S. T. M. end distillation points within the range 500° F.–800° F. My invention is particularly useful in connection with virgin or straight-run distillates.

The nature of the suspended haze-forming material is not known and I do not know why the treating temperature must be controlled within the aforementioned critical range. However, the facts are as indicated.

While I have described my invention in connection with certain specific details, it is to be understood that I am not bound thereby but only to the scope of the appended claims which should be construed as broadly as the prior art will permit.

I claim:

1. A method of treating and dehazing a petroleum distillate having a Saybolt universal viscosity within the range 33–70 seconds at 100° F., a 10% A. S. T. M. distillation point within the range 400° F.–425° F., and an A. S. T. M. end distillation point within the range 500° F.–800° F., comprising treating said distillate with an aqueous solution of alkali at a temperature within the approximate range 170° F.–210° F.

2. A method according to claim 1 in which the alkali is caustic soda.

3. A method of treating and dehazing a petroleum distillate having a Saybolt Universal viscosity within the range 33–70 seconds at 100° F., a 10% A. S. T. M. distillation point within the range 400° F.–425° F., and an A. S. T. M. end distillation point within the range 500° F.–800° F., comprising treating said distillate with an aqueous solution of alkali at a temperature within the approximate range 180° F.–200° F.

4. A method according to claim 3 in which the alkali is caustic soda.

5. A method of treating and dehazing a furnace oil comprising contacting said furnace oil with an aqueous solution of alkali at a temperature within the approximate range 170°–210° F.

6. A method of treating and dehazing a furnace oil comprising contacting said furnace oil with an aqueous solution of alkali at a temperature within the approximate range 180° F.–200° F.

7. A method of treating and dehazing a furnace oil comprising contacting said furnace oil with an aqueous solution containing about 1% to 15% NaOH at a temperature within the approximate range 170° F.–210° F.

8. A method of treating and dehazing a furnace oil comprising contacting said furnace oil with an aqueous solution containing about 2% to 10% NaOH at a temperature within the approximate range 180° F.–200° F.

9. A method of treating a No. 2 fuel oil comprising contacting said fuel oil with an aqueous solution of alkali at a temperature within the approximate range 170° F.–210° F.

10. A method of treating a straight-run furnace oil for the removal of haze-forming constituents comprising contacting said furnace oil with an aqueous solution of alkali at a temperature of about 170° F.–210° F.

11. A method of removing haze-forming constituents from a distillate furnace oil produced by a topping operation comprising passing said furnace oil from the topping operation into contact with a dilute aqueous solution of caustic soda at a temperature of about 170° F.–210° F.

12. A method of removing haze-forming constituents from a distillate furnace oil produced by a topping operation comprising passing said furnace oil from the topping operation into contact with a dilute aqueous solution of caustic soda at a temperature of about 180° F.–200° F.

RICHARD Z. WILLIAMS.